United States Patent
Dean et al.

(10) Patent No.: US 9,597,931 B2
(45) Date of Patent: Mar. 21, 2017

(54) TIRE INFLATION SYSTEM AND METHOD OF CONTROL

(71) Applicant: ArvinMeritor Technology, LLC, Troy, MI (US)

(72) Inventors: Simon Dean, West Bloomfield, MI (US); Kenneth Flory, Commerce Township, MI (US); Robert W. Trostle, Royal Oak, MI (US); Jonathan Honig, Bloomfield, MI (US); Anatoli Koulinitch, Farmington Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 405 days.

(21) Appl. No.: 14/051,847

(22) Filed: Oct. 11, 2013

(65) Prior Publication Data
US 2015/0101702 A1    Apr. 16, 2015

(51) Int. Cl.
*B60C 23/02* (2006.01)
*B60C 23/00* (2006.01)

(52) U.S. Cl.
CPC .................... *B60C 23/003* (2013.01)

(58) Field of Classification Search
CPC .... B60C 23/10; B60C 23/0415; B60C 23/042
USPC ....... 340/442, 441, 444, 447; 73/146.2, 490, 73/507, 509
See application file for complete search history.

(56) References Cited

U.S. PATENT DOCUMENTS

| | | | |
|---|---|---|---|
| 4,860,579 A | | 8/1989 | Beverly |
| 5,180,456 A | * | 1/1993 | Schultz .................... 152/416 |
| 5,263,524 A | * | 11/1993 | Boardman ................ 152/416 |
| 6,894,607 B1 | * | 5/2005 | Claussen .................. 340/442 |
| 6,994,136 B2 | | 2/2006 | Stanczak |
| RE41,756 E | | 9/2010 | Claussen et al. |
| 7,931,061 B2 | | 4/2011 | Gonska et al. |
| 2002/0179345 A1 | | 12/2002 | Bell |
| 2003/0216845 A1 | | 11/2003 | Williston |
| 2006/0174943 A1 | * | 8/2006 | Alff ........................... 137/224 |
| 2011/0175716 A1 | | 7/2011 | Medley et al. |
| 2012/0186714 A1 | | 7/2012 | Richardson |
| 2012/0234447 A1 | | 9/2012 | Narloch et al. |

FOREIGN PATENT DOCUMENTS

DE    3703128 A1    8/1988
WO    2012068583 A1    5/2012

OTHER PUBLICATIONS

Meritor an ArvinMeritor brand, Mentor Tire Inflation System (MTIS) by PSI (TM), including Mentor ThermALERT (TM), PB-9999, revised May 2007.
European Patent Office, European Search Report for the corresponding European Patent Application No. EP 14 18 4857 mailed Jan. 29, 2015.

* cited by examiner

Primary Examiner — Tai Nguyen
(74) Attorney, Agent, or Firm — Brooks Kushman P.C.

(57) ABSTRACT

A tire inflation system and a method of control. A tire pressure sampling interval may be triggered based on a type of tire pressure drop, wheel speed, or temperature.

20 Claims, 2 Drawing Sheets

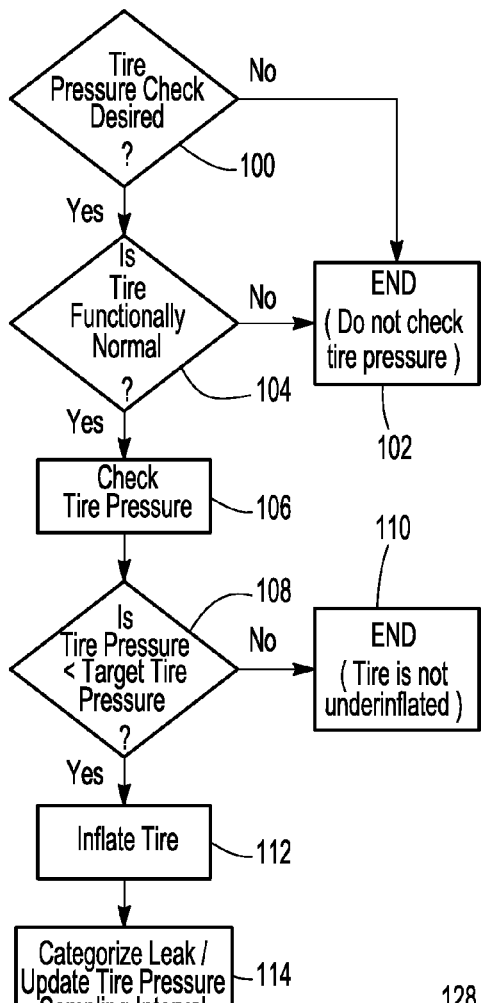
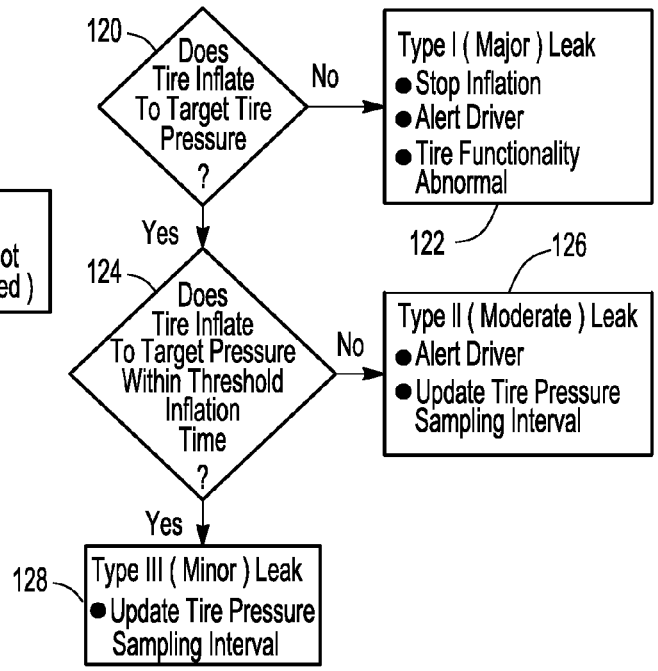
Fig-2
Fig-3
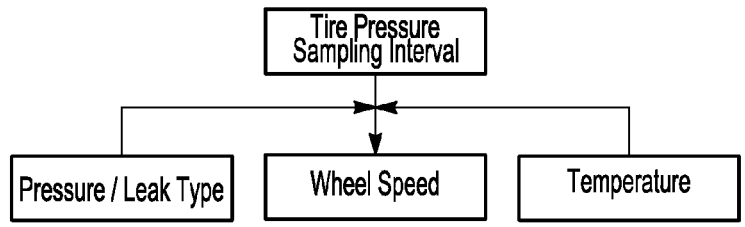
Fig-4

TIRE INFLATION SYSTEM AND METHOD OF CONTROL

TECHNICAL FIELD

This patent application relates to a tire inflation system and a method of control.

BACKGROUND

A tire pressure monitoring method is disclosed in U.S. Reissue Pat. No. RE41,756.

SUMMARY

In at least one embodiment, a method of controlling a tire inflation system is provided. The method may include checking an inflation pressure of a tire when a tire pressure sampling interval has elapsed. The tire may be inflated when the inflation pressure is less than the target tire pressure. A type of tire pressure drop may be categorized based on inflation time of the tire. The tire pressure sampling interval may be measured based on at least one of time data from a real-time clock, a travel distance of the vehicle, engine temperature, and ambient temperature.

In at least one embodiment, a method of controlling a tire inflation system is provided. The method may include determining a tire pressure sampling interval for a tire. The inflation pressure of a tire may be checked when a tire pressure sampling interval has elapsed. The inflation pressure of the tire may be checked before the tire pressure sampling interval has elapsed based on data indicative of a vehicle speed or wheel speed.

In at least one embodiment, a method of controlling a tire inflation system is provided. The method may include determining a tire pressure sampling interval for a tire. The inflation pressure of a tire may be checked when a tire pressure sampling interval has elapsed. A check of the inflation pressure of the tire may be triggered before the tire pressure sampling interval has elapsed based on at least one of an ambient temperature and a wheel end temperature.

BRIEF DESCRIPTION OF THE DRAWINGS

FIG. 2 is a flowchart of an exemplary method of control of the tire inflation system.

FIG. 3 is a flowchart of an exemplary method of categorizing a tire pressure drop.

FIG. 4 is a chart depicting attributes that may be used to modify or override a tire pressure sampling interval.

DETAILED DESCRIPTION

Figure 1:
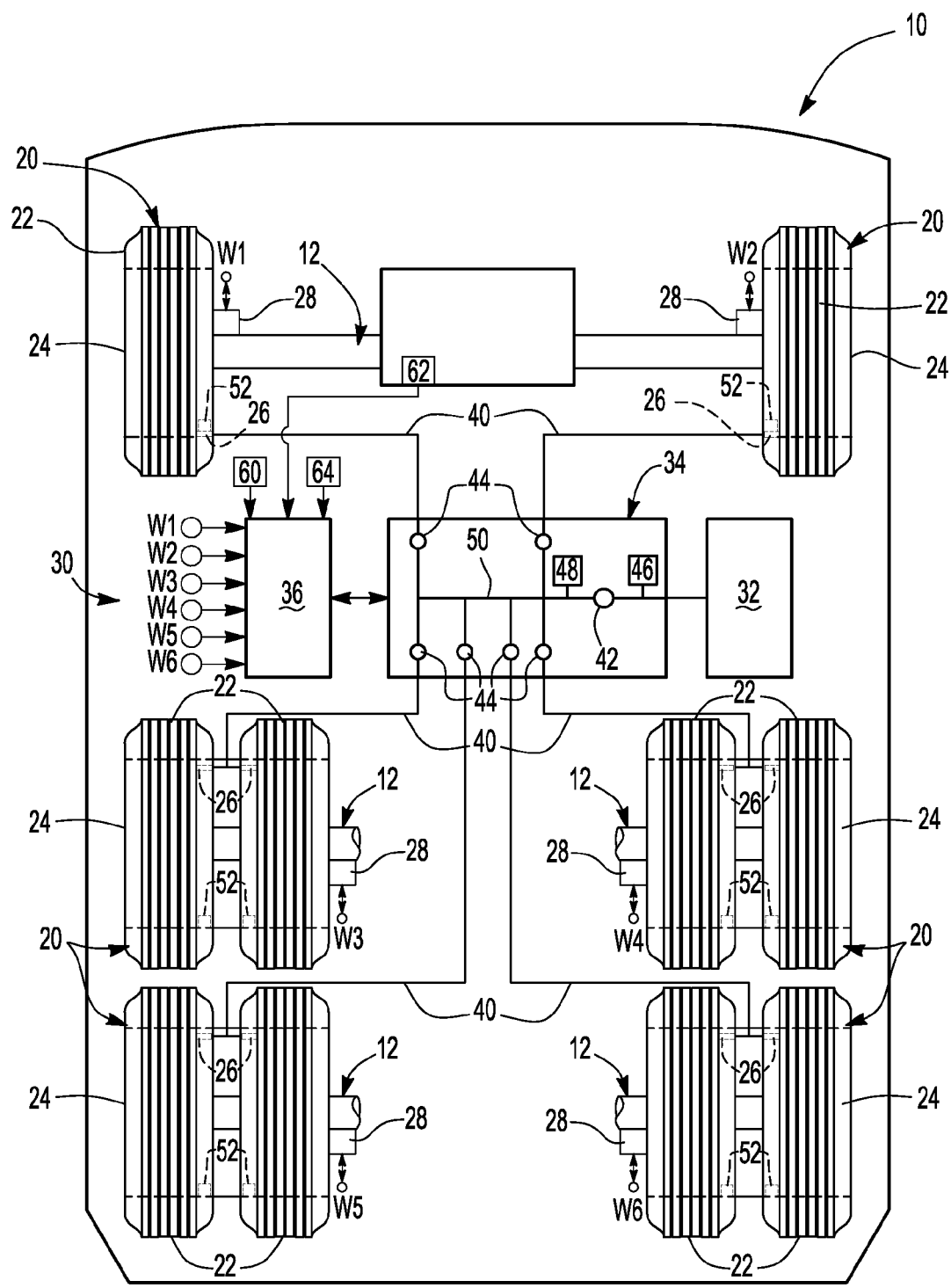
FIG. 1 is a schematic of an exemplary vehicle having a tire inflation system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels.

The vehicle 10 may include a plurality of axles or axle assemblies 12 that may support and facilitate rotation of at least one wheel assembly 20. In FIG. 1, a fragmentary portion the axle assemblies 12 are shown for clarity. An axle assembly 12 may or may not be configured as a drive axle that may provide torque to at least one associated wheel assembly. In addition, an axle assembly 12 may or may not be configured to steer the vehicle 10. Moreover, an axle assembly may be configured as or may include a steering knuckle assembly in a non-drive axle configuration.

Each wheel assembly 20 may include at least one inflatable tire 22 that may be mounted on an associated wheel 24. Each tire 22 may have a tire valve 26 that may facilitate inflation of the tire 22. A tire valve 26 may extend through a hole in an associated wheel 24 and may be configured to provide gas to a chamber that may be disposed between or at least partially defined by the tire 22 and the wheel 24. Each tire valve 26 may be normally closed to inhibit pressurized gas from exiting the tire 22 through the tire valve 26. The tire valve 26 may open when pressurized gas is supplied to the tire valve 26 under sufficient pressure, such as a pressure that is greater than the pressure inside the tire 22. In FIG. 1, the tire valve locations are generalized for illustration purposes and are not intended to be limiting.

A wheel speed sensor 28 may be provided to detect or provide data indicative of the speed of the vehicle 10. The wheel speed sensor 28 may be of any suitable type. For example, the wheel speed sensor 28 may be configured to detect the rotational speed of a wheel 24 or associated wheel axle. Data from the wheel speed sensor 28 may also be used to determine a distance of travel of the vehicle 10. For instance, the distance of travel may be based on tire size (e.g., tire diameter) and the rotational distance or number of revolutions detected by the wheel speed sensor 28. In at least one embodiment, a wheel speed sensor 28 may be associated with each wheel assembly 20 or wheel axle, such as may be provided with an anti-lock brake system (ABS) or traction control system. As such, the wheel speed sensor 28 may also detect wheel slip or unexpected rotation of a wheel assembly 20 in a manner known by those skilled in the art.

The vehicle 10 may also include a tire inflation system 30 that may monitor or determine tire pressure and that may inflate one or more tires 22. More specifically, the tire inflation system 30 may be configured to provide a pressurized gas or pressurized gas mixture to one or more tires 22 via a corresponding tire valve 26. For clarity, the term "pressurized gas" may refer to a pressurized gas or a pressurized gas mixture in this application. The tire inflation system 30 may include a pressurized gas source 32, a gas supply subsystem 34, and a control system 36.

The pressurized gas source 32 may be configured to supply and/or store a volume of a pressurized gas or pressurized gas mixture, such as air and/or nitrogen. For example, the pressurized gas source 32 may include a tank and/or a pump like a compressor that may be driven by a vehicle engine or vehicle power source. The pressurized gas source 32 may be disposed on the vehicle 10 and may be configured to provide a pressurized gas or pressurized gas mixture at a pressure that is greater than or equal to a target tire pressure or a target inflation pressure of a tire 22. Each tire 22 may or may not have the same target tire pressure in one or more embodiments.

The gas supply subsystem 34 may fluidly connect the pressurized gas source 32 to one or more tires 22. The gas supply subsystem 34 may include one or more conduits 40, such as a hose, tubing, pipe, or combinations thereof, which may provide pressurized gas to at least one tire 22 via a corresponding tire valve 26. The conduit configuration in FIG. 1 is merely exemplary. For instance, a single conduit 40 may be associated with each tire 22 rather than multiple tires as is shown in the bottom half of FIG. 1. In at least one embodiment, the gas supply subsystem 34 may include an inlet valve 42, at least one outlet valve 44, a first pressure sensor 46, and a second pressure sensor 48.

The inlet valve 42 may enable or disable the flow of pressurized gas from an outlet of the pressurized gas source 32 to at least one outlet valve 44. Operation of the inlet valve 42 may be controlled by the control system 36. For instance, the inlet valve 42 may include or may be controlled by an actuator, such as solenoid, that may actuate the inlet valve 42 between an open position and a closed position. In the open position, pressurized gas may flow from the pressurized gas source 32 to a manifold 50. The manifold 50 may distribute pressurized gas to multiple conduits 40 and may be disposed between the inlet valve 42 and one or more outlet valves 44. In the closed position, pressurized gas may be inhibited from flowing from the pressurized gas source 32 to the manifold 50. In at least one embodiment, the inlet valve 42 may be normally closed under predetermined operating conditions, such as when the vehicle 10 is not operational or turned off or when the vehicle engine is not running. As such, the inlet valve 42 may inhibit depressurization of the pressurized gas source 32 in the event of a downstream leak.

The outlet valve 44 may enable or disable the flow of pressurized gas from the manifold 50 to a tire 22 or tire valve 26. In FIG. 1, six outlet valves 44 are shown, although it is contemplated that a greater or lesser number of outlet valves 44 may be provided. Each outlet valve 44 may be associated with a different tire 22 and a different conduit 40. Moreover, each outlet valve 44 may be actuated independently of the inlet valve 42 and independently of each other. As such, the inflation and pressure assessment of different tires 22 or sets of tires 22 may be independently controlled. Operation of the outlet valve 44 may be controlled by the control system 36. For instance, the outlet valve 44 may include or may be controlled by an actuator, such as solenoid, that may actuate the outlet valve 44 between an open position and a closed position. In the open position, pressurized gas may flow from the manifold 50 to at least one corresponding tire valve 26. In the closed position, pressurized gas may be inhibited from flowing from the manifold 50 to at least one corresponding tire valve 26. As such, pressurized gas may not be constantly provided to one or more tires 22, which may facilitate the use of pressure pulses to determine tire pressure as will be discussed in more detail below. In addition, the outlet valve 44 may allow a conduit 40 to be vented to the surrounding environment between the outlet valve 44 and a corresponding tire valve 26. In at least one embodiment, the outlet valve 44 may be normally closed under predetermined operating conditions, such as when the vehicle 10 is not operational or turned off or when the vehicle engine is not running.

The first pressure sensor 46 may be configured to detect the pressure of the pressurized gas provided by the pressurized gas source 32. The first pressure sensor 46 may be of any suitable type and may be fluidly connected to the pressurized gas source 32. For example, the first pressure sensor 46 may be fluidly connected to the pressurized gas source 32 between the pressurized gas source 32 and the inlet valve 42.

The second pressure sensor 48 may be configured to detect the pressure of the pressurized gas provided to a tire 22 or tire valve 26. The second pressure sensor 48 may be of any suitable type and may be disposed between the inlet valve 42 and the tire valve 26 and may be fluidly connected to the manifold 50. As such, the second pressure sensor 48 may be isolated from the pressurized gas source 32 by closing the inlet valve 42. In at least one embodiment, the second pressure sensor 48 may be disposed between the inlet valve 42 and one or more outlet valves 44 so that the second pressure sensor 48 may be used to detect the pressure of pressurized gas supplied to different tires. Alternatively, multiple second pressure sensors 48 may be provided that may detect the pressure supplied to a particular conduit 40 or particular tire 22.

Optionally, a tire pressure sensor 52 that may be disposed inside the tire 22 or inside a tire chamber that receives the pressurized gas. Such a tire pressure sensor 52 may provide a signal or data that is indicative of the inflation pressure of the tire to the control system 36. The tire pressure sensor 52 may wirelessly communicate with the control system 36 in one or more embodiments.

The control system 36 may monitor and control operation of the tire inflation system 30. The control system 36 may include one or more electronic controllers or control modules that may monitor and/or control various components of the tire inflation system 30. For example, the control system 36 may be configured to control actuation of the inlet valve 42 and the outlet valve 44 to control the flow of pressurized gas. In addition, the control system 36 may be configured to receive data from the first pressure sensor 46 and the second pressure sensor 48 that may be indicative of pressure. In FIG. 1, communication between the control system 36 and these components is represented by the double arrowed line that is located adjacent to the control system 36.

The control system 36 may also communicate with and/or receive data from other devices, such as sensors like the wheel speed sensors 28, an ambient temperature sensor 60, an engine temperature sensor 62, and a wheel end temperature sensor 64.

Communication between the control system 36 and each wheel speed sensor 28 is represented by connection nodes W1 through W6 in FIG. 1.

The ambient temperature sensor 60 may detect or provide data indicative of a temperature of ambient air in the environment surrounding the vehicle 10 or proximate the vehicle 10. The ambient temperature sensor 60 may be a physical sensor that may be disposed on the vehicle 10 or a virtual sensor. For example, a virtual ambient air temperature sensor may be based on temperature data that may be wirelessly transmitted to the vehicle 10. Such temperature data may be based on the location of the vehicle 10, which may be provided by a global positioning system (GPS) or other telemetry or location data.

The engine temperature sensor 62 may detect or provide data indicative of an engine temperature. For example, the engine temperature sensor 62 may detect the temperature of a fluid associated with the engine of the vehicle 10, such as a coolant temperature or oil temperature as these fluids receive thermal energy when the engine is running.

The wheel end temperature sensor 64 may detect or provide data indicative of the temperature of one or more components that may be associated with a wheel end assembly that may rotatably support a wheel 24. For instance, the wheel end temperature sensor 64 may detect or provide data indicative of a tire temperature and/or a brake temperature.

Referring to FIG. 2, a flowchart of an exemplary method of control of the tire inflation system 30 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 36 and may be implemented as a closed loop control system. Moreover, the method may be enabled or disabled based on the operating state of the vehicle 10. For example, the method or control logic may be enabled when the vehicle ignition is turned on, when the engine is running, or when the vehicle is in motion in one or more embodiments. In addition, the method may be manually activated.

The method will be primarily described in the context of evaluating the pressure of a single tire, but it is to be understood that the method may be applied to evaluate and/or adjust the pressure of multiple tires or sets of tires.

As an overview, the method may determine a tire pressure sampling frequency or determine when to check the pressure of a tire. The method may also trigger or execute a tire pressure check or adjust the tire pressure sampling frequency based on tire pressure or various factors that may be indicative of changes in tire pressure, such as tire pressure leakage, wheel rotational speed, and/or temperature attributes. These factors may override a previously established tire pressure sampling frequency and may cause the tire pressure to be checked sooner. Moreover, a different tire pressure sampling frequency may be set for individual tires or sets of tires. As such, tire pressure sampling may be tailored to an individual tire and/or changes in operational characteristics of the vehicle or vehicle environment.

Tailoring or adjusting tire pressure sampling may help inhibit tire overinflation in a tire inflation system that checks tire pressure by opening a tire valve. For example, tire pressure may be determined by opening a tire valve with a pulse of pressurized gas and then measuring the pressure upstream or in a supply conduit. The pressurized gas pulse forces an additional volume of pressurized gas into the tire, thereby increasing the tire pressure. The cumulative effect of multiple pressure pulses may result in overinflation of the tire. Such tire overinflation may be exasperated in a system that checks tire pressure every vehicle ignition cycle (e.g., each time the vehicle is turned on). For instance, use of such a system in a vehicle that undergoes frequent stops and/or frequent vehicle ignition cycles (e.g., a delivery truck or cargo loading equipment) may result in frequent tire pressure checks and oversample the tire pressure, which may cause tire overinflation, increase pressurization and wear in associated seals, and increase the demand for pressurized gas from a pressurized gas source.

At block 100, the method may determine whether a tire pressure check or tire pressure sampling is desired. Tire pressure sampling or sampling of the inflation pressure of a tire may be desired when a tire pressure sampling interval has elapsed. Initially, a tire pressure sampling interval may be set at a default value or default period of time for one or more tires. The tire pressure sampling interval may be expressed in terms of time or distance.

A tire pressure sampling interval expressed in terms of time may be measured with a timer, clock, or counter (which may be collectively referred to as a timer herein) that may be associated with the control system 36. The timer may stop when the vehicle is not operational (e.g., when the ignition is turned off) or may be reset during each ignition cycle (e.g., time measurement may cease in a configuration in which power is not supplied to the timer when the ignition is turned off). Alternatively, a timer that is not reset during each ignition cycle (e.g., a real-time clock that continuously keeps track of time even when the ignition is turned off) or that is based on time data that may be provided by an external source and/or wirelessly transmitted to the vehicle (such as by a global positioning system or wireless network) may be employed for time measurement.

A tire pressure sampling interval expressed in terms of time may also be measured based on data from the ambient temperature sensor 60 and the engine temperature sensor 62. Data from the engine temperature sensor 62 may be indicative of an amount of time that the engine has been turned off. More specifically, the temperature of a previously running engine may decrease over time after the engine is turned off. The rate of change in engine temperature may be affected by the ambient temperature. For example, the engine temperature may decrease more rapidly at lower ambient temperatures than at higher ambient temperatures. As such, engine temperature and ambient temperature may be used to calculate or estimate the amount of time that the engine has been turned off. For instance, a lookup table may be populated with time values or "time since engine off" values that may be referenced with engine temperature and ambient temperature values. A time value may be calculated or referenced when the vehicle is turned on and this time value may be compared to the tire pressure sampling interval to determine how much time, if any, remains in the tire pressure sampling interval. For example, if the total elapsed time (e.g., sum of the time elapsed since the last tire pressure check and the time elapsed while the engine was off) is greater than the tire pressure sampling interval, then the tire pressure sampling interval has been exceeded and a pressure check may be performed. If the total elapsed time is not greater than the tire pressure sampling interval, then a pressure check may not be performed until the tire pressure sampling interval has elapsed. Under this approach, engine temperature and ambient temperature may be used in place of a real-time clock or continuous time measurement that may require that power be continuously provided to a timer or microprocessor clock to provide a continuous time measurements that are not reset or lost when the vehicle is turned off. In addition, this approach may reduce tire pressure checks and potential tire overinflation as compared to automatically checking tire pressure each ignition cycle or each time the vehicle is turned on.

Vehicle travel distance may also be employed as the basis for the tire pressure sampling interval. For instance, the tire pressure sampling interval may be expressed in terms of distance (e.g., feet, miles, kilometers, etc.) such that a tire pressure check may be desired when the vehicle has travelled a predetermined distance. As such, the tire pressure sampling interval may have elapsed when the travel distance of the vehicle exceeds a threshold vehicle travel distance. The threshold vehicle travel distance may be used such that tire pressure is checked each time the vehicle travels the threshold vehicle travel distance. The threshold vehicle travel distance may be based on vehicle development testing. Vehicle travel distance may be based on data from the wheel speed sensor 28, an onboard vehicle navigation system, and/or data from an external data source like a global positioning system (GPS) that may be indicative of vehicle speed and/or vehicle location.

It is also contemplated that time and distance may be used in conjunction to measure a tire pressure sampling interval. For instance, the tire pressure sampling interval may elapse when a threshold period of time has passed and the travel distance of the vehicle exceeds a threshold vehicle travel distance. As such, the method may be configured to reduce tire pressure checks when the vehicle has generally been stationary or has not travelled much distance.

A tire pressure check may be triggered or executed or the tire pressure sampling interval may be modified based on various factors as will be discussed in more detail below. If a tire pressure check or tire pressure sampling is not desired, then the method may end at block 102 without checking or sampling the tire pressure. If a tire pressure check is desired, the method may continue at block 104.

At block 104, tire functionality may be assessed. Tire functionality may be abnormal when a tire is not installed or when a tire blowout or major tire pressure drop has occurred. For example, a tire blowout or major pressure drop may exist when the tire cannot be inflated to a target tire pressure and/or when the target tire pressure cannot be maintained for a threshold period of time. Such tire functionality may be stored in memory and may be based on a previous iteration of the method. If tire functionality is not normal, then the method may end at block 102 without checking or sampling the tire pressure, thereby avoiding or reducing use of pressurized gas from the pressurized gas system. If tire functionality is normal or not abnormal, then the method may continue at block 106.

At block 106, the tire pressure may be checked or sampled. Tire pressure may be checked or sampled in various ways depending on the configuration of the tire inflation system. For example, tire pressure may be directly detected or measured with a tire pressure sensor that may be disposed inside the tire or inside a tire chamber that receives the pressurized gas. Such a tire pressure sensor may wirelessly transmit tire pressure data to the control system 36. Tire pressure may also be directly detected with a pressure sensor that is disposed outside the tire. For example, tire pressure may be detected or measured by opening the tire valve 26 with a pressurized gas pulse and detecting pressure of a feedback pulse with the second pressure sensor 48. Tire pressure may also be indirectly detected with a pressure sensor that is disposed outside the tire as is described in U.S. patent application Ser. No. 14/029,884, the disclosure of which is hereby incorporated by reference in its entirety.

At block 108, the detected or measured tire pressure may be compared to a target tire pressure. The target tire pressure may be indicative of a desired tire pressure and may account for design tolerances of the tire valve 26, such as the tolerance range associated with opening the tire valve 26. The target tire pressure may be a predetermined value that may be based on the make and model of the tire and/or vehicle development testing. If the detected or measured tire pressure is not less than the target tire pressure, then the tire is not underinflated (i.e., the tire is inflated to at least the target tire pressure) and the method may end at block 110 and the tire pressure sampling interval may be maintained. If the detected or measured tire pressure is less than the target tire pressure, then the tire may be underinflated (e.g., a tire leak may have occurred) and the method may continue at block 112.

At block 112, the tire may be inflated. The tire may be inflated by providing pressurized gas from the pressurized gas source 32 to the tire 22 by opening the inlet valve 42 and the outlet valve 44 associated with the tire 22. Pressurized gas may be provided for a predetermined period of time and/or until the tire is inflated to the target tire pressure.

At block 114, a pressure drop associated with the tire may be categorized and the tire pressure sampling interval may be updated or revised if appropriate. An exemplary method of categorizing a tire pressure drop or categorizing of the ability of a tire to maintain pressure is shown in FIG. 3. In the example shown in FIG. 3, pressure drops are categorized as being major (Type I), moderate (Type II), or minor (Type III); however, it is contemplated that a greater or lesser number of pressure drop categories may be employed. A major (Type I) pressure drop may be associated with a greater tire pressure drop than a moderate (Type II) pressure drop. A moderate (Type II) pressure drop may be associated with a greater tire pressure drop than a minor (Type III) pressure drop.

At block 120, the method may determine whether the tire can be inflated to the target tire pressure. The tire pressure may be detected or measured as previously discussed with reference to block 112. If the tire cannot be inflated to the target tire pressure or cannot adequately maintain the target tire pressure, then the method may continue at block 122. If the tire can be inflated to the target tire pressure or can adequately maintain the target tire pressure, then the method may continue at block 124.

At block 122, a Type I (major) pressure drop may exist since the tire cannot be inflated to the target tire pressure or adequately maintain the target tire pressure. As such, pressurized gas that is provided to the tire may escape to the surrounding environment and not inflate the tire. For instance, a major pressure drop may exist when the tire pressure does not reach the target tire pressure when the tire is inflated and may be indicative of a tire blowout or major tire leak or may be indicative of leakage or a pressure drop elsewhere in the tire inflation system, such as a wheel seal or a damaged or missing pneumatic line. The inflation time may be limited to limit depletion of the pressurized gas source. For instance, the supply of pressurized gas to inflate a tire may be terminated when the tire cannot be inflated to the target tire pressure within a predetermined inflation period of time or within a predetermined vehicle travel distance. The predetermined inflation period of time or predetermined vehicle travel distance may be default values that may be set to provide sufficient time or distance is provided to inflate a tire that may be flat but able to maintain the target tire pressure or that may have a moderate or minor pressure drop. The predetermined inflation period of time may be greater than the threshold inflation time that may be used to distinguish a minor pressure drop from a moderate pressure drop as discussed below. In response, the method may stop providing pressurized gas to the tire by closing a valve, such as the inlet valve 42 and/or the associated outlet valve 44. In addition, an alert, alarm, or error message may be provided to the driver. The alert, alarm, or error message may be of any suitable type, such as an audible signal, visual signal, tactile (haptic) signal, or combinations thereof, and may identify a tire and warn the driver that the target tire pressure cannot be obtained or maintained and that a major pressure drop or blowout may have occurred. In addition, a memory flag may be set to indicate that the functionality of the tire is abnormal for use in conjunction with block 104. As such, block 104 may prevent additional tire pressure sampling of the associated tire until the tire is serviced or replaced or the memory flag has been reset. For example, the memory flag may be reset manually by the driver with an input device (e.g., button, switch, touchscreen sensor, or the like).

At block 124, the method may determine whether the tire inflates to the target tire pressure within a threshold inflation time (i.e., whether the time to inflate the tire to the target tire pressure does not exceed a threshold inflation time). The tire inflation time may be measured with a timer, counter, or clock which may be started when tire inflation begins, such as when the inlet valve 42 and outlet valve 44 are opened. The threshold inflation time may be a predetermined value that may be based on the attributes of the tire and/or tire inflation system 30 (e.g., tire size, flow rate of gas from the pressurized gas source, conduit size, valve actuation speed, etc.) and/or vehicle development testing. If the tire does not inflate to the target tire pressure within the threshold inflation time, then the method may continue at block 126. If the tire is inflated to the target tire pressure within the threshold inflation time, then the method may continue at block 128.

At block 126, a Type II (moderate) pressure drop may exist since the tire can be inflated to the target tire pressure but takes more time to be inflated than expected. As such, the tire may adequately maintain tire pressure for a period of time, but may be experiencing a pressure drop or may be leaking pressurized gas such that more frequent tire pressure sampling is desired. In response, the method may reduce the tire pressure sampling interval for that tire by a predetermined moderate pressure drop adjustment amount or to a predetermined value that may be associated with a moderate pressure drop. In addition, an alert, alarm, or error message may be provided to the driver. The alert, alarm, or error message may be of any suitable type, such as an audible and/or visual signal, and may identify a tire and warn the driver that a moderate pressure drop may be in progress and may indicate that the tire should be checked or serviced. A memory flag associated with functionality of the tire may continue to indicate that tire functionality is normal since the target tire pressure can be obtained and maintained. As such, additional tire pressure sampling may be permitted at block 104 during a future iteration of the method.

At block 128, a Type III (minor) pressure drop may exist since the tire can be inflated to the target tire pressure and can be inflated within the threshold inflation time. As such, the tire may adequately maintain tire pressure for a longer period of time than a tire with a Type II (moderate) pressure drop, but may be experiencing a pressure drop or may be leaking pressurized gas such that more frequent tire pressure sampling is desired as compared with a tire that does not experience a pressure drop. In response, the method may reduce the tire pressure sampling interval for that tire by a predetermined minor pressure drop adjustment amount or to a predetermined value associated with a minor pressure drop. The predetermined moderate pressure drop adjustment amount or predetermined value associated with a Type III pressure drop may differ from the predetermined minor pressure drop adjustment amount or predetermined value associated with a Type II pressure drop. As such, tire pressure may be sampled more frequently when a Type II (moderate) pressure drop is detected than for a Type III (minor) pressure drop. As one example, a pressure drop adjustment amount for a Type II (moderate) pressure drop may reduce the tire pressure sampling interval by 30 minutes and a pressure drop adjustment amount for a Type III (minor) pressure drop may reduce the tire pressure sampling interval by 15 minutes. An alert, alarm, or error message may not be provided to the driver. A memory flag associated with functionality of the tire may continue to indicate that tire functionality is normal since the target tire pressure can be obtained and maintained.

Referring to FIG. 4, a chart is shown that depicts attributes that may be used to trigger, override, modify, or interrupt a previously established tire pressure sampling interval. These attributes may be used independently or in combination to trigger an immediate tire pressure check at block 100 or shorten the tire pressure sampling interval such that a tire pressure check may be executed sooner than may otherwise occur if the tire pressure sampling interval was not modified. Attributes may include or may be based on pressure, wheel speed, and temperature.

As discussed above, tire pressure data may be employed to categorize a tire pressure drop and the type of tire pressure drop may be used to modify the tire pressure sampling interval. Thus, the tire pressure sampling interval may be reduced or overridden as the ability of a tire to maintain pressure decreases.

Wheel speed may be used to infer a change in tire pressure. For example, wheel speed may be detected for a first wheel and a second wheel using corresponding wheel speed sensors 28. The first wheel and the second wheel may be provided on the same axle assembly or may be provided on different axle assemblies in one or more embodiments. If the detected wheel speeds are sufficiently close to each other or within a threshold wheel speed amount (e.g., the difference between the first wheel speed and the second wheel speed is less than the threshold wheel speed amount), then a tire may not be underinflated. If the detected wheel speeds are not sufficiently close to each other (e.g., the difference between the first wheel speed and the second wheel speed is not less than the threshold wheel speed amount), then the wheel having the smaller effective radius or greater rotational speed may have an underinflated tire and the tire pressure sampling interval may be decreased and/or a tire pressure check may be triggered or executed. The wheel speed may also be compared to the wheel speeds of additional tires to provide additional confidence that a wheel may have an underinflated tire. In addition, a wheel speed may be compared to a reference wheel speed or reference vehicle speed rather than to the speed of another wheel to infer a change in tire pressure. Such reference speed values may be based on sensors on the vehicle or may be virtual speed data, such as may be provided by a GPS system.

As another example, wheel speed may be detected with a wheel speed sensor 28 and may be compared to a threshold wheel speed value. The threshold wheel speed value may be indicative of an expected wheel rotational speed for a wheel having a tire that is not underinflated. If the detected or measured wheel speed or wheel speed over a predetermined sample time is less than the threshold wheel speed value, then the tire pressure may be less than the target tire pressure and the tire pressure sampling interval may be decreased and/or a tire pressure check may be triggered or executed. If the detected or measured wheel speed or wheel speed over a predetermined sample time is not less than the threshold wheel speed value, then the tire may not be underinflated and the current tire pressure sampling interval may be maintained.

Temperature data may be used to infer a change in tire pressure. Such temperature data may be provided by the ambient temperature sensor 60 and/or the wheel end temperature sensor 64.

Tire pressure may change in response to environmental or ambient temperature conditions. Such ambient temperature changes may occur rapidly, such as when a vehicle rapidly ascends to a higher elevation or descends to a lower elevation, such as may occur when driving in mountainous terrain. Tire pressure may decrease as ambient temperature decreases. As such, tire pressure may drop below the target tire pressure due to ambient temperature changes before a tire pressure sampling interval lapses. As such, the rate of change of ambient temperature may be used to revise the tire pressure sampling interval. For example, a rate of change in the ambient temperature (such as may be measured in ° C./min) may be detected or calculated based on data from the ambient temperature sensor 60. The rate of change in ambient temperature may be compared to a threshold ambient temperature rate of change value. If the rate of change of the ambient temperature exceeds the threshold ambient temperature rate of change value, then the tire pressure may be less than the target tire pressure and the tire pressure sampling interval may be decreased and/or a tire pressure check may be triggered or executed. If the rate of change of the ambient temperature does not exceed the threshold ambient temperature rate of change value, then the tire may not be underinflated and the current tire pressure sampling interval may be maintained.

Wheel end temperature may also be used to adjust the tire pressure sampling interval. Low tire pressure or pressure that is substantially below the target tire temperature may result in an increase in temperature of components associated with a wheel end assembly. For example, low tire pressure may result in elevated wheel bearing temperatures or wheel bearing failure, which in turn may increase the temperature proximate the wheel bearings that rotatably support the wheel of the underinflated tire. This additional thermal energy from the wheel bearings may be conducted to one or more associated components, such as the wheel or brake assembly components for the underinflated tire. As such, the wheel end temperature sensor 64 may detect the associated increase in temperature. The temperature detected by the wheel end temperature sensor 64 may be compared to a threshold wheel end temperature value. If the wheel end temperature exceeds the threshold wheel end temperature value, then the tire pressure may be less than the target tire pressure and the tire pressure sampling interval may be decreased and/or a tire pressure check may be triggered or executed. If the threshold wheel end temperature value does not exceed the threshold wheel end temperature value, then the tire may not be underinflated and the current tire pressure sampling interval may be maintained.

Alternatively, a tire may be underinflated when the temperature detected by the wheel end temperature sensor 64 exceeds the temperature detected by another wheel end temperature sensor 64 that may be associated with another tire. If the detected wheel end temperatures are sufficiently close to each other or within a threshold wheel end temperature amount (e.g., the difference between a first wheel end temperature and the second wheel end temperature is less than the threshold wheel end temperature amount), then a tire may not be underinflated. If the detected wheel end temperatures are not sufficiently close to each other, then the wheel having the higher wheel end temperature may have an underinflated tire and the tire pressure sampling interval may be decreased and/or a tire pressure check may be triggered or executed. A wheel end temperature may also be compared to the wheel end temperature of additional tires to provide additional confidence that a wheel may have an underinflated tire. The threshold wheel end temperature amount may be established by or based on vehicle development testing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a tire inflation system for a vehicle comprising:
   checking an inflation pressure of a tire when a tire pressure sampling interval has elapsed; and
   inflating the tire when the inflation pressure is less than a target tire pressure;
   wherein the tire pressure sampling interval is expressed in terms of distance and is measured based on a travel distance of the vehicle or wherein the tire pressure sampling interval is expressed in terms of time and is measured based on engine temperature or ambient temperature.

2. The method of claim 1 wherein the tire pressure sampling interval is measured based on time data from a real-time clock that is not reset each ignition cycle.

3. The method of claim 1 wherein the tire pressure sampling interval is measured based on time data from a real-time clock and wherein the real-time clock is based on time data that is wirelessly transmitted to the vehicle.

4. The method of claim 1 wherein the tire pressure sampling interval is based on the travel distance of the vehicle and the tire pressure sampling interval has elapsed when the travel distance of the vehicle exceeds a threshold vehicle travel distance.

5. The method of claim 4 wherein the tire pressure sampling interval is based on the travel distance of the vehicle and time data from a real-time clock, wherein the tire pressure sampling interval has elapsed when the travel distance of the vehicle exceeds the threshold vehicle travel distance and an amount of time elapsed based on the time data from the real-time clock exceeds the tire pressure sampling interval.

6. The method of claim 1 wherein inflation pressure of the tire is not checked when a vehicle ignition cycle is initiated.

7. The method of claim 1 wherein at least part of the tire pressure sampling interval is measured based on engine temperature and ambient temperature.

8. The method of claim 7 wherein a time value indicative of a time that an engine has been turned off is based on engine temperature and ambient temperature.

9. The method of claim 8 wherein the tire pressure sampling interval has elapsed when a total elapsed time exceeds the tire pressure sampling interval, wherein the total elapsed time is a sum of a time elapsed since a previous tire pressure check measured with a timer and the time value.

10. A method of controlling a tire inflation system comprising:

determining a tire pressure sampling interval for a tire;
checking an inflation pressure of the tire when the tire pressure sampling interval has elapsed;
checking the inflation pressure of the tire before the tire pressure sampling interval has elapsed based on data indicative of vehicle speed or wheel speed; and
inflating the tire when the inflation pressure is less than a target tire pressure.

11. The method of claim 10 wherein the inflation pressure the tire is checked before the tire pressure sampling interval has elapsed when a difference between a first wheel speed and a second wheel speed is greater than a threshold wheel speed value for a predetermined period of time.

12. The method of claim 11 wherein the first wheel speed and the second wheel speed are provided by first and second wheel speed sensors provided with wheels on different axle assemblies.

13. The method of claim 11 wherein the first wheel speed and the second wheel speed are provided by first and second wheel speed sensors provided with different wheels of an axle assembly.

14. The method of claim 13 further comprising categorizing a type of pressure drop of the tire when the inflation pressure is less than the target tire pressure and adjusting the tire pressure sampling interval based on the type of pressure drop.

15. A method of controlling a tire inflation system comprising:
determining a tire pressure sampling interval for a tire;
checking an inflation pressure of the tire when the tire pressure sampling interval has elapsed;
triggering a check of the inflation pressure of the tire before the tire pressure sampling interval has elapsed based on at least one of an ambient temperature and a wheel end temperature; and
inflating the tire when the inflation pressure is less than a target tire pressure.

16. The method of claim 15 wherein the check of the inflation pressure of the tire is triggered when a rate of change of the ambient temperature exceeds a threshold ambient temperature rate of change value.

17. The method of claim 15 wherein the check of the inflation pressure of the tire is triggered when the wheel end temperature exceeds a wheel end temperature value.

18. The method of claim 17 wherein the wheel end temperature is provided with a wheel end temperature sensor.

19. The method of claim 17 wherein the check of the inflation pressure of the tire is triggered when the wheel end temperature proximate a first wheel exceeds a wheel end temperature proximate a second wheel.

20. The method of claim 15 further comprising categorizing a type of pressure drop of the tire when the inflation pressure is less than the target tire pressure and adjusting the tire pressure sampling interval based on the type of pressure drop.

* * * * *

UNITED STATES PATENT AND TRADEMARK OFFICE
CERTIFICATE OF CORRECTION

PATENT NO. : 9,597,931 B2  
APPLICATION NO. : 14/051847  
DATED : March 21, 2017  
INVENTOR(S) : Simon Dean et al.

Page 1 of 1

It is certified that error appears in the above-identified patent and that said Letters Patent is hereby corrected as shown below:

In the Claims

Column 13, Line 10, Claim 11:
After "wherein the inflation pressure"
Insert -- of --.

Signed and Sealed this
Thirtieth Day of May, 2017

Michelle K. Lee
*Director of the United States Patent and Trademark Office*